United States Patent [19]
Mihara et al.

[11] Patent Number: 6,151,033
[45] Date of Patent: *Nov. 21, 2000

[54] METHOD AND APPARATUS FOR PRODUCING ANIMATION DATA

[75] Inventors: Marumi Mihara; Masaaki Oka, both of Kanagawa, Japan

[73] Assignee: Sony Computer Entertainment Inc., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/644,338

[22] Filed: May 10, 1996

[30] Foreign Application Priority Data

May 12, 1995 [JP] Japan .................................. 7-138648

[51] Int. Cl.$^7$ .................................................. G06T 13/00
[52] U.S. Cl. ............................................................ 345/475
[58] Field of Search .................................... 345/473, 427, 345/475, 437, 474, 121

[56] References Cited

U.S. PATENT DOCUMENTS 4,797,836   1/1989   Witek et al. ............................. 345/473
5,619,628   4/1997   Fujita et al. ............................ 345/427

OTHER PUBLICATIONS

Foley et al., Computer Graphics: Principles and Practice, Second Edition, pp. 201–227, Jan. 1990.

*Primary Examiner*—Joseph H. Feild
*Assistant Examiner*—Alford W. Kindred
*Attorney, Agent, or Firm*—Fulwilder Patton Lee & Utecht, LLP

[57] ABSTRACT

An animation data producing system having a key frame management unit for managing key frame data to form pictures of key frames having principal changes of motion in an animation of plural frames and obtained by laying out component elements of the animation in a three-dimensional space; and a data interpolation unit for forming, by interpolation for each component element, picture data for the frames required between two adjacent key frames by using the key frame data obtained from the key frame management unit. The data interpolation unit includes a rotation angle calculator means, wherein, when the process of interpolating the component element relates to a rotation thereof around a single axis, the rotation angle in the frame for interpolation is calculated while the component element is considered to be rotated around an arbitrary axis between the key frames anterior and posterior to the relevant frame to be obtained by interpolation. The data interpolation unit further includes a means for calculating a rotational matrix on the basis of the rotation angle obtained. The apparatus is capable of realizing, in production of animation data with interpolation between key frames, a satisfactory animation with natural rotary motion.

22 Claims, 5 Drawing Sheets

F I G. 1
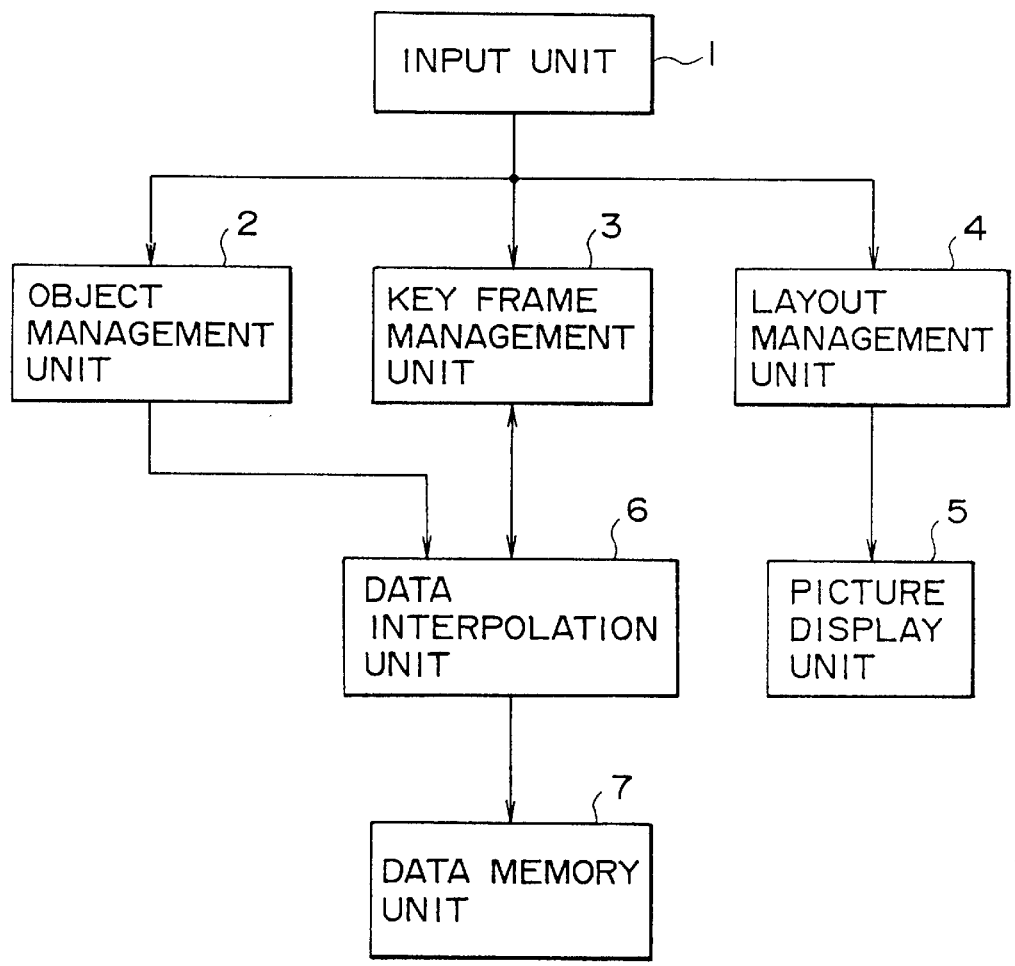
F I G. 2
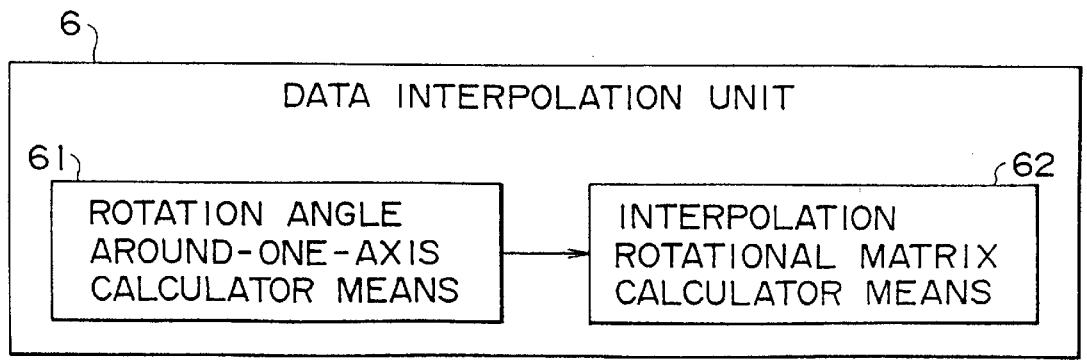

FIG. 6A
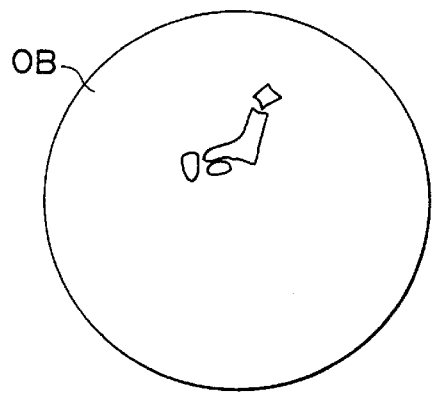
KEY FRAME F1
FIG. 6B
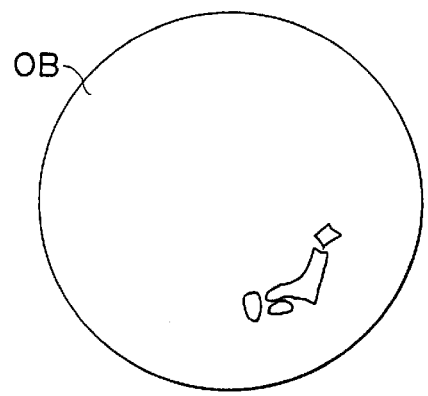
KEY FRAME F2
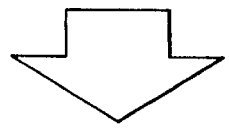
FIG. 6C
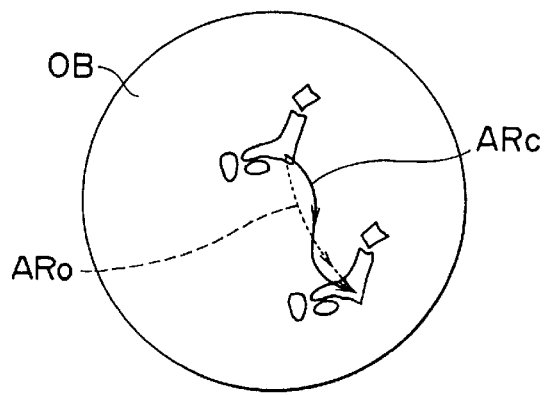

METHOD AND APPARATUS FOR PRODUCING ANIMATION DATA

This application claims priority under the International Convention based upon Japanese Patent Application No. P07-138648 filed May 12, 1995.

BACKGROUND OF THE INVENTION

This invention relates generally to improvements in methods and apparatus for producing animation data and, more particularly, to a new and improved system for production of enhanced rotary animation data.

Heretofore, in producing an animation product by conventional manual techniques, it has generally been customary to execute the steps of first determining the total number of required animation frames for smoothing the motion of a desired animation product from the beginning to the end thereof, and then producing the individual pictures for the entire sequence of required frames. However, considerable time and effort are needed to produce all of the animation pictures for the entire frame sequence.

More recently, there have been methods of producing an animation product by adapting the technique of computer graphics. This approach is remarkably effective, particularly for production of three-dimensional animation.

One of the methods for producing animation data through use of such computer graphics is a method of key frame interpolation. In accordance with this latter method, a user regards pictures of principal change points as key frames in a desired animation sequence, and produces only the pictures of such key frames.

Generally, a key frame is formed by an operator with a three-dimensional layout of the picture of each component element (hereinafter referred to as an object) in the animation. Picture data of such objects are prepared as model data in a memory or the like and can be read out therefrom by the operator for use as needed. The model data may be expressed in either two-dimensional or three-dimensional terms.

Frames of transitional animation data, i.e., interpolation frames between the key frames, are formed automatically through an interpolation process by utilizing the correlation between the objects in adjacent key frames which precede and follow the interpolation frames in the sequence of frames. More specifically, when the objects included in the preceding and following adjacent key frames, anterior and posterior, respectively, to the interpolation frames have been displaced or rotated, the displaced positions or rotational changes of the objects in the interpolation frames between the two key frames are calculated through an interpolation process from the data of the objects included in the preceding and following key frames. Such an interpolation process is executed with respect to each of the objects in the animation.

Thus, it becomes possible to produce animation data having relatively smooth and continuous motions in three-dimensional space. Accordingly, in an animation data producing apparatus based on the afore-described technique of computer graphics, a series of animation data can be produced with relative ease by merely controlling the picture data of only the key frames.

In a method of producing an animation where any change of an object between two key frames is such that a two- or three-dimensional object is rotated around an axis in a three-dimensional space, the following related prior art is known with regard to an interpolation process for an object in an interpolation frame.

Generally, the rotation of an object in a three-dimensional space is expressed through decomposition or resolution into rotational angle components around an X-axis, a Y-axis and a Z-axis which are three coordinate axes for representing the three-dimensional space. That is, the rotation is expressed through decomposition into the angle component around the X-axis, the angle component around the Y-axis and the angle component around the Z-axis. Although the rotation may also be expressed in polar coordinates depending on some specific application, this is rather rare in the related art.

In the animation data producing apparatus of the prior art, interpolation data of each object in the interpolation frame is obtained by first interpolating the rotational angle components around the X-, Y- and Z-axes independently of one another and then compositing such components.

However, according to a method of producing rotary animation data in the animation producing apparatus of related art, the rotational angle components around the X-, Y- and Z-axes are interpolated independently of one another, so that the rotation is rendered different from what was actually intended by the animator and, therefore, the animation rendition becomes unnatural.

This disadvantage occurs because the rotation of the object is interpolated while the rotation components thereof around the X-, Y- and Z-axes are processed as independent and linear.

More specifically, in accordance with the positions of an interpolation frame and two key frames anterior and posterior thereto, the rotation angle in that interpolation frame (the rotation angle at the intermediate position between the two key frames) is determined. If the rotation angles around the X-, Y- and Z-axes are determined independently of one another, the rotation in each interpolation frame becomes such that the rotation axes of the object are rendered mutually different in the individual interpolation frames.

Because there exists no correlation among the X-, Y- and Z-axes and, even in the case of linear rotation around each axis, the rotation in each interpolation frame obtained by compositing the mutually independent rotation components around the three axes is also rendered independently in each frame.

In this regard, since the rotation is performed while the axis thereof is being changed as described, if an interpolation frame between a first key frame and a second frame is formed by the animation data producing method of the related art, the resultant animation is such that the rotational locus thereof is different from a natural rotary motion around one axis between the first key frame and the second key frame and is therefore unnatural in its rendition.

Accordingly, there has been a long existing need for enhanced accuracy, efficiency and more natural rendition in image processing for generation of interpolation frames between key frames of an animation sequence, and particularly where rotary animation data is involved. The present invention fulfills these needs.

SUMMARY OF THE INVENTION

Briefly, and in general terms, the present invention provides enhanced, more natural rendition of rotational object sequences in the production of animation data for an animation sequence where interpolation frames are generated between adjacent key frames along a time axis, utilizing only a single axis of rotation corresponding to the motion of a component element in transitioning between the key frames.

It is an object of the present invention to provide a method and an apparatus capable of realizing, in production of animation data with interpolation between key frames, a natural rotary animation even in the case of performing rotational interpolation.

In accordance with one aspect of the present invention, there is provided a method of producing animation data composed of a plurality of frames. The method comprises the steps of setting a plurality of key frames by disposing component elements of an animation on a selected time axis; obtaining a single axis of rotation corresponding to the motion of the component element between two of the key frames; and forming an interpolation frame by interpolating the motion of the component element while processing the motion as a rotation around the single axis of rotation.

According to another aspect of the present invention, there is provided an apparatus for producing animation data composed of a plurality of frames. The apparatus comprises a means for configuring a plurality of key frames by disposing component elements of an animation on a selected time axis; a means for obtaining a single rotation axis corresponding to the motion of the component element between two of the key frames; and a means for forming an interpolation frame by interpolating the motion of the component element while processing the motion as a rotation around the single axis of rotation.

According to a further aspect of the present invention, there is provided an animation data producing apparatus which comprises a means for storing data of a plurality of key frames where component elements of an animation are disposed on a selected time axis; a means for obtaining one axis of rotation corresponding to the motion of the component element between two of the key frames; a means for obtaining an interpolation frame between the two key frames by rotating the component element around a single axis of rotation; and a means for outputting the interpolation frame thus obtained.

In the picture data producing method and apparatus of the invention having the above constitution, when interpolation is performed during a rotation of the component element, there is first calculated the rotation angle in the rotation of the component element around an arbitrary axis between the two key frames. Then the rotation angle in the frame to be interpolated is calculated on the basis of such rotation angle. And further the rotation angle of the interpolation frame is decomposed into angle components around the X-, Y- and Z-axes of a three-dimensional space, and an interpolation process is executed with regard to each of the three axes.

Since the rotation angle in the interpolation frame is the angle regarding only a single arbitrary axis, it is possible to produce satisfactory animation data with natural rotation.

Hence, the present invention satisfies a long existing need for enhanced accuracy, efficiency and more natural rendition in image processing for generation of interpolation frames between key frames of an animation sequence, and particularly where rotary animation data is involved.

These and other objects, features, and advantages of the invention will become apparent from the following more detailed description, when taken in conjunction with the accompanying drawings of illustrative embodiments.

DESCRIPTION OF THE DRAWINGS

FIG. 1 is a block diagram illustrating a presently preferred embodiment of an animation data producing system in accordance with the present invention;

FIG. 2 is a block diagram of a principal subsystem means in the embodiment of the animation data producing apparatus shown in FIG. 1;

FIG. 6A to 6C are explanatory diagrams each illustrating the motion of a rotary animation obtained by interpolation between adjacent key frames.

DESCRIPTION OF THE PREFERRED EMBODIMENTS

Figure 3:
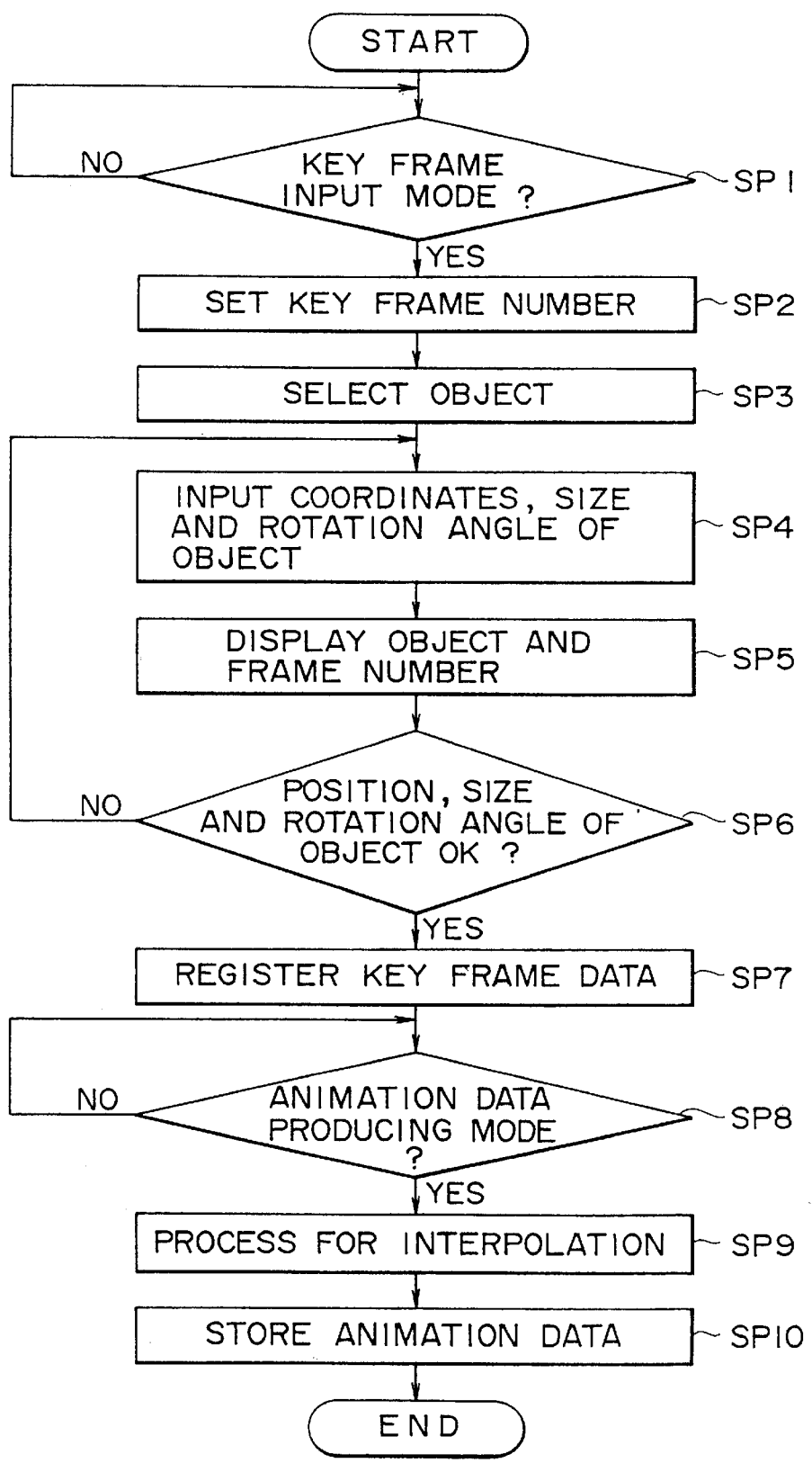
FIG. 3 is a flowchart illustrating the processing operation of the subsystem shown in FIG. 2 for the embodiment of the animation data producing apparatus in FIG. 1.

Referring now to the drawings, like reference numbers denote like or corresponding parts throughout the drawing figures.

Figure 5:
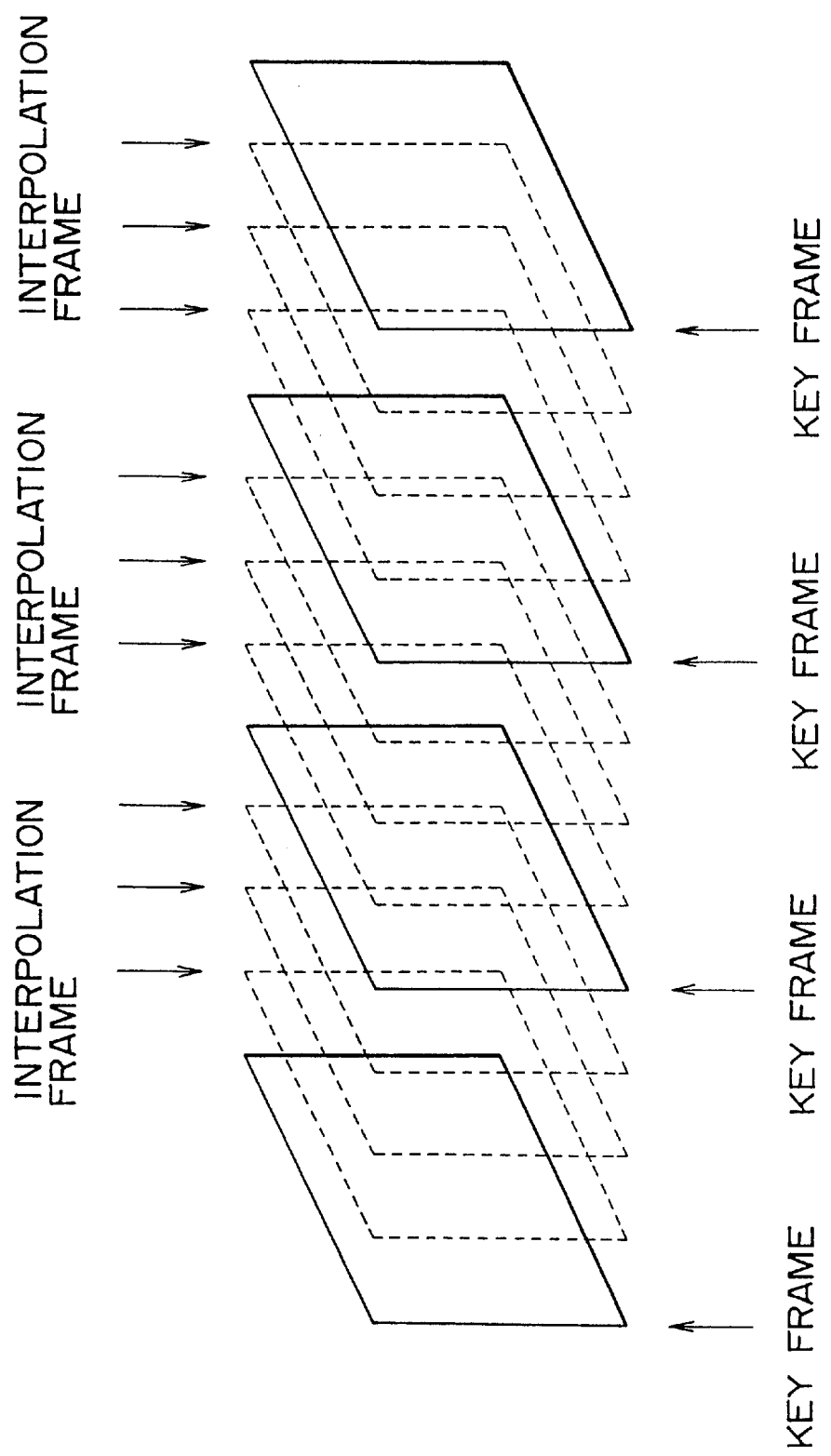
FIG. 5 is an explanatory diagram illustrating how animation data are produced by interpolation with key frames.

By way of background information, to enhance further understanding of the invention, reference is first made to FIG. 5 of the drawings wherein frames of dotted line quadrilaterals, i.e., interpolation frames between the key frames, are formed automatically through an interpolation process by utilizing the correlation between the objects in adjacent key frames which precede and follow the interpolation frames in the sequence of frames. More specifically, when the objects included in the preceding and following adjacent key frames, anterior and posterior respectively, to the interpolation frames have been displaced or rotated, the displaced positions or rotational changes of the objects in the interpolation frames between the two key frames are calculated through an interpolation process from the data of the objects included in the preceding and following key frames. Such an interpolation process is executed with respect to each of the objects in the animation.

Thus, it becomes possible to produce animation data having relatively smooth and continuous motions in three-dimensional space. Accordingly, in an animation data producing apparatus based on the afore-described technique of computer graphics, a series of animation data can be produced with relative ease by merely controlling the picture data of only the key frames.

In a method of producing an animation where any change of an object between two key frames is such that a two- or three-dimensional object is rotated around an axis in a three-dimensional space, the following related prior art is known with regard to an interpolation process for an object in an interpolation frame.

Generally, the rotation of an object in a three-dimensional space is expressed through decomposition or resolution into rotational angle components around an X-axis, a Y-axis and a Z-axis which are three coordinate axes for representing the three-dimensional space. That is, the rotation is expressed through decomposition into the angle component around the X-axis, the angle component around the Y-axis and the angle component around the Z-axis. Although the rotation may also be expressed in polar coordinates depending on some specific application this is rare in the related art.

In the animation data producing apparatus of the prior art, interpolation data of each object in the interpolation frame is obtained by first interpolating the rotational angle components around the X-, Y- and Z-axes independently of one another and then compositing such components.

However, according to a method of producing rotary animation data in the animation producing apparatus of related art, the rotational angle components around the X-, Y- and Z-axes are interpolated independently of one another, so that the rotation is rendered different from what was actually intended by the animator and, therefore, the animation rendition becomes unnatural.

This disadvantage occurs because the rotation of the object is interpolated while the rotation components thereof around the X-, Y- and Z-axes are processed as independent and linear.

More specifically, in accordance with the positions of an interpolation frame and two key frames anterior and posterior thereto, the rotation angle in that interpolation frame (the rotation angle at the intermediate position between the two key frames) is determined. If the rotation angles around the X-, Y- and Z-axes are determined independently of one another, the rotation in each interpolation frame becomes such that the rotation axes of the object are rendered mutually different in the individual interpolation frames. Because there exists no correlation among the X-, Y- and Z-axes and, even in the case of linear rotation around each axis, the rotation in each interpolation frame obtained by compositing the mutually independent rotation components around the three axes is also rendered independently in each frame.

Suppose now that an object OB is a picture of the globe as illustrated in FIGS. 6A to 6C for example, and the picture of the globe OB in a first key frame F1 is rotated from the state of FIG. 6A to become the picture of FIG. 6B in a second key frame F2. In this regard, since the rotation is performed while the axis thereof is being changed as described, if an interpolation frame between a first key frame and a second key frame is formed by the animation data producing method of the related art, the resultant animation is such that the rotational locus thereof is denoted by a solid-line arrow Arc in FIG. 6C.

As best observed in FIG. 1, the animation data producing apparatus comprises an input unit 1, an object management unit 2, a key frame management unit 3, a layout management unit 4, a picture display unit 5, a data interpolation unit 6, and a data memory unit 7.

The input unit 1 is equipped with a keyboard, a mouse and the like, and receives various inputs from an operator. The input unit 1 supplies event information, such as character information or command information corresponding to the input from the operator, to the object management unit 2, the key frame management unit 3 and the layout management unit 4. For example, a command for selectively changing a processing mode, information for producing key frame data, or a command for producing a series of animation data, is supplied from the input unit 1 to the related unit.

Each of the object management unit 2, the key frame management unit 3 and the layout management unit 4 has a memory for storing the data and manages the data required for producing a series of animation data.

The object management unit 2 stores and manages, in its memory, the objects which are component elements of the desired animation to be produced, such as model data for forming a picture of, e.g., an airplane, helicopter or car.

Prior to production of the desired animation, the model data is supplied via the input unit 1 and a conventional scanner or picture reader (not shown) to the object management unit 2, where object ID for identifying the individual objects are added to the model data and are managed therein.

The key frame management unit 3 manages the key frame data which constitute key frame pictures formed by laying out the model data in a three-dimensional space in response to a command from the operator, as described above.

In the embodiment of FIG. 1, the key frame data is composed of various information including the object ID relative to the object selectively designated by the operator via the input unit 1, the coordinate positions on the frame where the object is disposed, the size (reduced or enlarged) of the object, and the rotation angle of the object.

The key frame management unit 3 adds a frame number to each key frame so as to indicate the original number thereof counted from the beginning of the series of animations, and manages the data of the individual key frames. In other words, the key frame management unit 3 manages the positions of the entire sequence of frames, which constitute the series of animations inclusive of the key frames, by using the relative time from the beginning position of the first frame in the series of animations.

The layout management unit 4 forms, at the time of producing the key frame data, a picture display signal for displaying the picture of the key frame being produced, and then supplies this signal to the picture display unit 5. Further, as will be subsequently described, the layout management unit 4 forms a picture display signal for displaying the series of animations inclusive of the interpolation frames produced on the basis of the key frames, and supplies this signal to the picture display unit 5.

The picture display unit 5 typically consists of the cathode-ray tube or a liquid crystal display device and displays pictures of a series of key frames in accordance with the picture display signal obtained from the layout management unit 4.

At the time of producing key frame data, for example, the object management unit 2, the key frame management unit 3 and the picture display unit 5 are operated as shown in FIG. 3.

When the operator has selected a key frame input mode via the input unit 1 for producing key frame data (SP1), each unit is rendered ready, in response to such selection, to wait for input of information for production of a key frame. And upon setting of the number of a desired key frame via the input unit 1 by the operator (SP2), this frame number is supplied to the key frame management unit 3.

Subsequently, the operator selects an object to be displayed on the relevant key frame (SP3), and supplies to the input unit 1 the required data such as the coordinate position on the frame where the object is disposed, the size of the object, the rotation angle thereof, etc. (SP4).

The data thus inputted are supplied successively to the layout management unit 4. Then the layout management unit 4 acquires model data of the selected object from the object management unit 2 on the basis of the supplied data, and forms a picture display signal for displaying the picture where the object is disposed on the frame.

Simultaneously the layout management unit 4 receives, via the input unit 1, the data representing the number of the relevant frame, and then forms a picture display signal for displaying the frame number with the picture of the frame.

The picture display signal thus formed is supplied to the picture display unit 5, and the picture of the key frame is displayed on the screen of the picture display unit 5 (SP5). Then the operator adjusts the position, size and rotation angle of the object while watching the displayed picture on the screen of the display unit 5.

Upon completion of setting input with regard to all of the objects to be displayed on the relevant key frame, the operator confirms that the picture displayed on the picture display unit 5 is satisfactory, and then depresses a determination key on the keyboard of the input unit 1 or clicks the mouse to determine the produced key frame (SP6), thereby registering the key frame data in the key frame management unit 3 (SP7).

In this manner, the operator produces all of the key frame data, which is required for producing the desired animation, while watching the picture displayed on the picture display unit 5.

After completing production of all of the key frame data required for the desired series of animation data and registration of such key frame data entirely in the key frame management unit 3, the operator selects an animation data production mode (SP8) to thereby produce the desired series of animation data. Production of the animation data is performed in the data interpolation unit 6.

In response to the information from the object management unit 2 and the key frame management unit 3, the data interpolation unit 6 generates picture data of interpolation frames on the basis of the picture data of the key frames, thereby producing the desired series of animation data.

More specifically, upon selection of the animation data production mode, the key frame management unit 3 supplies the key frame data to the data interpolation unit 6 in response to the mode selection information obtained from the input unit 1, and then notifies the object management unit 2 of the object ID relative to the object designated by the key frame data. Subsequently, the object management unit 2 reads out the corresponding model data and supplies that data to the data interpolation unit 6, to which the interpolation frame number is also supplied as the frame position information from the key frame management unit 3.

Thereafter, the data interpolation unit 6 detects, from the interpolation frame number, the two key frames anterior and posterior to that interpolation frame, and forms the picture data of the interpolation frame between the two key frames on the basis of the data of the two key frames and the model data of the object designated by the key frame data. In this manner, the data interpolation unit 6 produces the picture data of the interpolation frame, which is required between the key frames, by a process of interpolation in accordance with the spatial distance between each of the preceding and following key frames and the relevant interpolation frame. Here, the data interpolation unit 6 grasps the spatial distance from each of the preceding and following key frames to each interpolation frame on the basis of the positional information of each frame, i.e., the frame number.

As described, the data interpolation unit 6 produces desired series of animation data by generating picture data of the interpolation frames between the key frames (SP9). Subsequently, the data interpolation unit 6 sends the animation data thus produced to a data memory unit 7.

The data memory unit 7 has a storage medium such as a magnetic disk or an optical disk, wherein the series of animation data composed of the key frame data and the interpolation frame data are stored on the disk or the like (SP10).

As previously mentioned, prior to storing the series of animation data in the data memory unit 7, the animation data produced in the data interpolation unit 6 are supplied, in an animation picture monitor mode, via the key frame management unit 3 to the layout management unit 4 and then are displayed on the picture display unit 5, whereby the animation can be monitored.

When the series of animation data thus produced need to be corrected by monitoring, it is possible to further smooth the motion of the animation by correcting some key frames therein or adding adequate key frames thereto.

The layout management unit 4 is capable of displaying the series of animations at a predetermined speed in response to a command from the operator, and also capable of displaying the pictures of individual frames one by one as if turning over pages, hence, ensuring effective correction or confirmation of the pictures.

In the data memory unit 8, animation data may be stored in the form of image data, or data for displaying the object ID, coordinate position and rotation thereof may be stored as well. In the latter case, where the same model data as those in the object management unit 2 are necessary for reproducing the animation, such model data may be stored in the data memory unit 7, or a memory having the same storage content as that in the internal memory of the object management unit 2 may be prepared in an animation playback apparatus.

When the object interpolation process in the data interpolation unit 6 involves a rotation around an axis, the process is executed in the data interpolation unit 6 in such a manner that the relevant object is considered to be rotated around an arbitrary axis on the basis of the data of the two key frames anterior and posterior to the interpolation frame, not in a manner that the interpolation is performed with regard to the rotation around each of the X-, Y- and Z-axes in the three-dimensional coordinate system.

Therefore, in performing the interpolation with regard to rotation, the data interpolation unit 6 executes the process by the use of a rotation angle around-one-axis calculator means 61 and an interpolation rotational matrix calculator means 62, as best shown in FIG. 2.

The rotation angle around-one-axis calculator means 61 calculates the rotation angle θ, which represents the angle rotation of an object around an arbitrary axis between two key frames, from the X-, Y- and Z-axis components of the rotation angle of the object in the two key frames. A more detailed description will be subsequently provided herein regarding calculation of the rotation angle θ.

The interpolation rotational matrix calculator means 62 first calculates the rotation angle θd in each interpolation frame in a state where the object is rotated within an angle range of [0, θ] between the two key frames, and then calculates an interpolation rotational matrix Rd by using the rotation angle θd thus obtained. Thereafter, the rotational matrix calculator means 62 decomposes the interpolation rotational matrix Rd into the angle data around the X-, Y- and Z-axes of the three-dimensional coordinate system, and calculates interpolation data.

Hereinafter an explanation will be provided regarding the manner of obtaining the rotation angle θ of the object around an arbitrary axis between the two key frames.

The rotation around the origin in a three-dimensional coordinate system is expressed by a 3×3 rotational matrix. Assuming now that a coordinate system B rotates a coordinate system A around the X-axis by rx degrees, around the Y-axis by ry degrees and around the Z-axis by rz degrees in this order, the rotational matrix is represented by Expression 1 as follows.

$$\begin{pmatrix} \cos(rz) & -\sin(rz) & 0 \\ \sin(rz) & \cos(rz) & 0 \\ 0 & 0 & 1 \end{pmatrix} \begin{pmatrix} \cos(ry) & 0 & \sin(ry) \\ 0 & 1 & 0 \\ -\sin(ry) & 0 & \cos(ry) \end{pmatrix}$$ [Expression 1]

-continued $$\begin{pmatrix} 1 & 0 & 0 \\ 0 & \cos(rx) & -\sin(rx) \\ 0 & \sin(rx) & \cos(rx) \end{pmatrix}$$

Supposing that the rotational matrix R is represented by Expression 2, its transposed matrix RT is represented by Expression 3.

$$R = \begin{pmatrix} R_{11} & R_{12} & R_{13} \\ R_{21} & R_{22} & R_{23} \\ R_{31} & R_{32} & R_{33} \end{pmatrix} \quad \text{[Expression 2]}$$

$$R^T = \begin{pmatrix} R_{11} & R_{21} & R_{31} \\ R_{12} & R_{22} & R_{32} \\ R_{13} & R_{23} & R_{33} \end{pmatrix} \quad \text{[Expression 3]}$$

$$= \begin{pmatrix} 1 & 0 & 0 \\ 0 & \cos(rx) & \sin(rx) \\ 0 & -\sin(rx) & \cos(rx) \end{pmatrix}$$

$$\begin{pmatrix} \cos(ry) & 0 & -\sin(ry) \\ 0 & 1 & 0 \\ \sin(ry) & 0 & \cos(ry) \end{pmatrix}$$

$$\begin{pmatrix} \cos(rz) & \sin(rz) & 0 \\ -\sin(rz) & \cos(rz) & 0 \\ 0 & 0 & 1 \end{pmatrix}$$

Since the condition of an equation $$R^T R = 1 \quad (1)$$

is satisfied in Expression 3, R is an orthogonal matrix. Inversely, an orthogonal matrix where $|R|=1$ is represented by Expression 3, and this matrix is a rotational one. It is generally known that an orthogonal matrix can be normalized as Expression 4 by the use of another orthogonal matrix T.

$$T^{-1}RT = \begin{pmatrix} 1 & 0 & 0 \\ 0 & \cos\theta & -\sin\theta \\ 0 & \sin\theta & \cos\theta \end{pmatrix} \quad \text{[Expression 4]}$$

When there are two arbitrary rotational matrixes A and B, R is set as $$R = A^{-1}B \quad (2)$$

and an orthogonal matrix T as mentioned is found and denoted by Expression 5. Then the above can be represented by Expression 6.

$$T^{-1}RT = \begin{pmatrix} 1 & 0 & 0 \\ 0 & \cos\theta & -\sin\theta \\ 0 & \sin\theta & \cos\theta \end{pmatrix} \quad \text{[Expression 5]}$$

$$T^{-1}A^{-1}BT = \begin{pmatrix} 1 & 0 & 0 \\ 0 & \cos\theta & -\sin\theta \\ 0 & \sin\theta & \cos\theta \end{pmatrix} \quad \text{[Expression 6]}$$

$$B = AT \begin{pmatrix} 1 & 0 & 0 \\ 0 & \cos\theta & -\sin\theta \\ 0 & \sin\theta & \cos\theta \end{pmatrix} T^{-1}$$

With change of the angle in a range of $[0, \theta]$, the aforementioned coordinate system A is rotated around one axis to become the state of the coordinate system B.

Thus, it is rendered possible, by finding an orthogonal matrix T, to interpolate the state between two arbitrary coordinate systems by the rotation thereof around a single axis.

The orthogonal matrix T can be found in the following manner. Suppose now that a proper vector of R expressed by Equation (3) and having an absolute value 1 is found.

$$Rt = t \quad (3)$$

Since the above is expressed as $$(R-E)t = 0 \quad (4)$$

(where E: unitary matrix), t is orthogonal to the component vector of the matrix (R−E).

Two primary independent sets are found out of the matrix (R−E), and the exterior product thereof is normalized to form $t_1$. Next, a vector perpendicular to $t_1$ is found by taking either factor of the matrix (R−E) from which $t_1$ has been obtained. This vector is also normalized to form $t_2$. Subsequently the exterior product of $t_1$ and $t_2$ is taken to form $t_3$. Each of $t_1$, $t_2$, and $t_3$ has an absolute value of 1 and these are mutually orthogonal, so that the matrix $(t_1\ t_2\ t_3)$ is an orthogonal one.

The matrix $(t_1\ t_2\ t_3)$ is T, the left side of Expression 5 can be represented by Expression 7.

$$T^{-1}RT = (t_1 t_2 t_3)^{-1} R(t_1 t_2 t_3) \quad \text{[Expression 7]}$$

$$= \begin{pmatrix} t_1^T \\ t_2^T \\ t_3^T \end{pmatrix} R(t_1 t_2 t_3)$$

$$= \begin{pmatrix} t_1^T R t_1 & t_1^T R t_2 & t_1^T R t_3 \\ t_2^T R t_1 & t_2^T R t_2 & t_2^T R t_3 \\ t_3^T R t_1 & t_3^T R t_2 & t_3^T R t_3 \end{pmatrix}$$

Since $Rt_1 = t_1$ as obvious from Equation (3), there is obtained Expression 8, so that Expression 7 can then be rewritten as Expression 9.

$$t_1^T R t_1 = t_1^T t_1 \quad \text{[Expression 8]}$$
$$t_2^T R t_1 = t_2^T R t_1$$
$$t_3^T R t_1 = t_3^T R t_1$$

$$T^{-1}RT = \begin{pmatrix} 1 & 0 & 0 \\ 0 & t_2^T R t_2 & t_2^T R t_3 \\ 0 & t_3^T R t_2 & t_3^T R t_3 \end{pmatrix} \quad \text{[Expression 9]}$$

Each element of Expression 9 is set as in Expression 10.

$$T^{-1}RT = \begin{pmatrix} 1 & 0 & 0 \\ 0 & A & B \\ 0 & C & D \end{pmatrix} \quad \text{[Expression 10]}$$

Since T and R are both orthogonal matrixes, $T^{-1}RT$ is also an orthogonal matrix, and there are the following relationships.

$$A^2+C^2=1 \quad (5)$$

$$B^2+D^2=1 \quad (6)$$

$$A^2+B^2=1 \quad (7)$$

$$C^2+D^2=1 \quad (8)$$

$$AB+CD=0 \quad (9)$$

$$AC+BD=0 \quad (10)$$

$$AD-BC=1 \quad (11)$$

By a subtraction of Equation (5)–Equation (8)

$$A^2-D^2=0$$

$$A=\pm D$$

And when A=−D, it is substituted for Equation (9), so that $$D(B-C)=0$$

Therefore,

D=0 or B=C Substituting D=0 for Equation (11),

−BC=1

By a subtraction of Equation (5)–Equation (7),

B=±C

Consequently,

B=−C=±1

Meanwhile, substituting A=−D, B=C for Equation (11), $$D^2-C^2=1$$

which signifies a contradiction. Therefore,

A=D=0

B=−C=±1

When A=D, it is substituted for Equation (9), so that

D(B+C)=0

Therefore,

D=0 or B=−C

If D=0, there is obtained B=−C=±1 in the same manner as the above. Meanwhile if D≠0, since B=−C,

A=D

B=−C $$C^2+D^2=1$$

in any case, whereby Expression 11 can be obtained. Thus, as mentioned, it becomes possible to find the orthogonal matrix T which satisfies the condition of Expression 5.

$$T^{-1}RT = \begin{pmatrix} 1 & 0 & 0 \\ 0 & \cos\theta & -\sin\theta \\ 0 & \sin\theta & \cos\theta \end{pmatrix} \quad \text{[Expression 11]}$$

On the basis of the theory described above, an interpolation process is performed with regard to the rotation of the object in the data interpolation unit 6.

Figure 4:
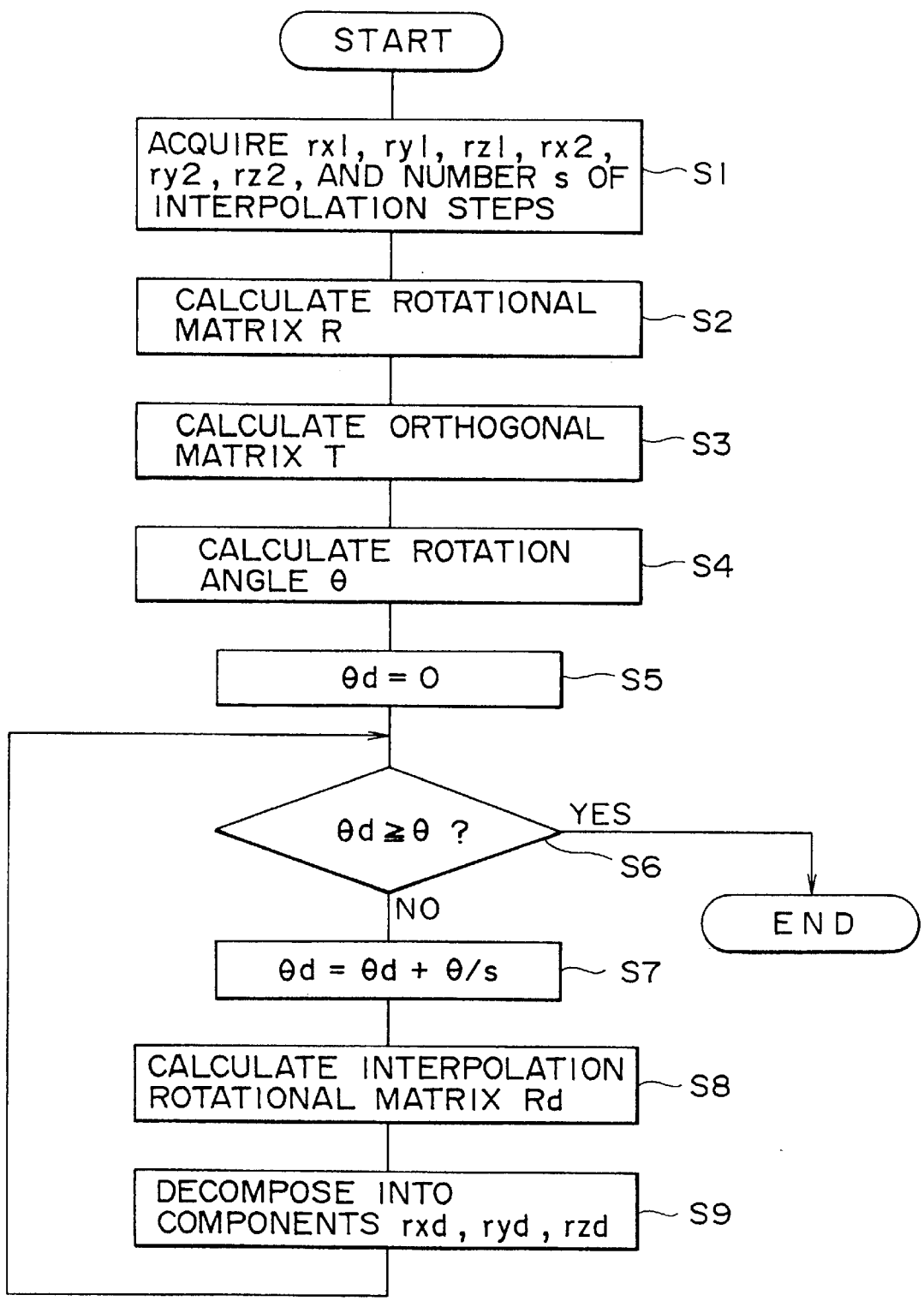
FIG. 4 is a flowchart illustrating an exemplary routine of interpolation executed with regard to a rotation in a data interpolation unit.

Referring now to FIG. 4 of the drawings, there is shown an exemplary routine for executing such interpolation with regard to the rotation in the data interpolation unit 6.

In FIG. 4, at step S1, there is acquired angle data rx1, ry1, rz1 around the X-axis, Y-axis, Z-axis of an object for interpolation in a key frame K1 anterior to an interpolation frame, and also angle data rx2, ry2, rz2 around the X-axis, Y-axis, Z-axis of an object for interpolation in a key frame K2 posterior to the interpolation frame, and further an interpolation step number s which denotes the number of interpolation frames between the two key frames K1 and K2.

Then the operation proceeds to step S2 to calculate a rotational matrix $R=R1^{-1}R2$ by using the angle data rx1, ry1, rz1 and the angle data rx2, ry2, rz2, where R1, $R1^{-1}$ and R2 are such as represented by Expression 12.

$$R1 = \begin{pmatrix} 1 & 0 & 0 \\ 0 & \cos(rx1) & -\sin(rx1) \\ 0 & \sin(rx1) & \cos(rx1) \end{pmatrix} \quad \text{[Expression 12]}$$

$$\begin{pmatrix} \cos(ry1) & 0 & \sin(ry1) \\ 0 & 1 & 0 \\ -\sin(ry1) & 0 & \cos(ry1) \end{pmatrix}$$

$$\begin{pmatrix} \cos(rz1) & -\sin(rz1) & 0 \\ \sin(rz1) & \cos(rz1) & 0 \\ 0 & 0 & 1 \end{pmatrix}$$

$$R1^{-1} = \begin{pmatrix} \cos(-rz1) & -\sin(-rz1) & 0 \\ \sin(-rz1) & \cos(-rz1) & 0 \\ 0 & 0 & 1 \end{pmatrix}$$

$$\begin{pmatrix} \cos(-ry1) & 0 & \sin(-ry1) \\ 0 & 1 & 0 \\ -\sin(-ry1) & 0 & \cos(-ry1) \end{pmatrix}$$

$$\begin{pmatrix} 1 & 0 & 0 \\ 0 & \cos(-rx1) & -\sin(-rx1) \\ 0 & \sin(-rx1) & \cos(-rx1) \end{pmatrix}$$

$$R2 = \begin{pmatrix} 1 & 0 & 0 \\ 0 & \cos(rx2) & -\sin(rx2) \\ 0 & \sin(rx2) & \cos(rx2) \end{pmatrix}$$

$$\begin{pmatrix} \cos(ry2) & 0 & \sin(ry2) \\ 0 & 1 & 0 \\ -\sin(ry2) & 0 & \cos(ry2) \end{pmatrix}$$

$$\begin{pmatrix} \cos(rz2) & -\sin(rz2) & 0 \\ \sin(rz2) & \cos(rz2) & 0 \\ 0 & 0 & 1 \end{pmatrix}$$

Subsequently, the operation proceeds to step S3 to calculate an orthogonal matrix T, which can be obtained in the manner mentioned. Thereafter, at step S4, the rotation angle θ of the object rotated around a single axis during the time from the key frame K1 to the key frame K2 is calculated from Expression 11 with respect to the orthogonal matrix T thus obtained. In this case, the axis of rotation is one around which the object follows its minimum rotation angle between the two key frames K1 and K2.

A process of interpolation is so executed that the object is successively rotated by an extremely small angle at each time in conformity to the number s of interpolation frames within a range [0, θ] of the calculated rotation angle θ. For this purpose, the angle θd in each interpolation frame is reset to zero (θd=0) at step S5. Subsequently, at step S6, a decision is made as to whether the process has been completed to the last one of the plural interpolation frames between the two key frames K1 and K2. When the result of the decision signifies completion, this routine is terminated.

If the result of the above decision is negative to signify that the process has not yet been completed, the operation proceeds to step S7 to find the angle θd in the relevant interpolation frame by executing a calculation of $$\theta d = \theta d + \theta/s.$$

And next at step S8, the interpolation rotational matrix Rd in the relevant interpolation frame is calculated according to Expression 13 given below.

$$R_d = T \begin{pmatrix} 1 & 0 & 0 \\ 0 & \cos\theta d & -\sin\theta d \\ 0 & \sin\theta d & \cos\theta d \end{pmatrix} T^{-1} \quad [\text{Expression 13}]$$

Thereafter, the operation proceeds to step S9, where the interpolation rotational matrix Rd obtained at step S8 is decomposed into angle data rxd, ryd and rzd around the X-axis, Y-axis and Z-axis. And upon completion of producing the interpolation data in this manner, the operation returns to step S6 to repeat the above process with regard to the next interpolation frame.

Thus, it becomes possible to produce desired interpolation data for attaining a natural rotary animation where each object is so rotated around an arbitrary axis as to plot its minimum rotation angle between the two key frames, as denoted by a dotted-line arrow Aro in FIG. 6C. In this case, as mentioned, the object to be rotated may be composed of either two-dimensional or three-dimensional data.

According to the present invention, as described hereinabove, the angle of a rotation in a three-dimensional space between two key frames is calculated while the rotation is regarded as one around a single arbitrary axis. Then the rotation angle in each interpolation frame between the two key frames is calculated with interpolation, and a process of interpolation is executed through conversion of the calculated rotation angle into angle data around the X-, Y- and Z-axes in a three-dimensional space coordinate system, hence realizing production of a desired animation with natural rotary motion intended by an animator.

Hence, the present invention satisfies a long existing need for enhanced accuracy, efficiency and more natural rendition in processing for generation of interpolation frames between key frames of an animation sequence, and particularly where rotary animation data is involved.

It will be apparent from the foregoing that, while particular forms of the invention have been illustrated and described, various modifications can be made without departing from the spirit and scope of the invention. Accordingly, it is not intended that the invention be limited, except as by the appended claims.

What is claimed is:

1. A method of producing animation data for an animation sequence, comprising the steps of:

creating and locating a plurality of key frames by disposing, on each key frame, component elements of an animation object on a selected time axis for said animation sequence, each of said component elements defined by picture data comprising position, dimension and angle data relative to a three-dimensional coordinate system;

obtaining a rotational matrix R corresponding to the motion of said component elements between two of said key frames using said angle data of said two key frames;

calculating an orthogonal matrix T with respect to said rotational matrix R;

calculating a rotation angle θ of said component elements rotated around a single axis with respect to said orthogonal matrix T; and generating an interpolation frame between said key frames under a condition that each of said component elements rotates around said single axis.

2. The method as recited in claim 1, further comprising the step of displaying the key frames.

3. The method as recited in claim 1, wherein said step of creating and locating a plurality of key frames includes the step of selecting a desired one of a plurality of component elements.

4. The method as recited in claim 1, wherein said step of creating and locating a plurality of key frames includes the step of setting the coordinates of component elements.

5. The method as recited in claim 1, wherein said step of creating and locating a plurality of key frames includes the step of setting the dimensions of component elements.

6. The method as recited in claim 1, wherein said step of creating and locating a plurality of key frames includes the step of setting the rotation angles of component elements.

7. The method as recited in claim 1, wherein said orthogonal matrix T satisfies the condition of $$T^{-1}RT = \begin{pmatrix} 1 & 0 & 0 \\ 0 & \cos\theta & -\sin\theta \\ 0 & \sin\theta & \cos\theta \end{pmatrix}.$$

8. The method as recited in claim 1, wherein said step of forming an interpolation frame comprises the steps of:

obtaining a rotation angle dθ in each interpolation frame in accordance with a number S of interpolation frames within a range of said rotation angle θ using the expression $$\theta d = \theta d + \theta/S;$$

calculating an interpolation rotational matrix Rd using the expression $$Rd = T \begin{pmatrix} 1 & 0 & 0 \\ 0 & \cos\theta d & -\sin\theta d \\ 0 & \sin\theta d & \cos\theta d \end{pmatrix} T^{-1}; \text{ and}$$

decomposing Rd into angle data around each axis of said three-dimensional coordinate system.

9. The method of claim 1 wherein said single axis is one around which said object follows a minimum rotation angle between said two key frames.

10. An apparatus for producing animation data, comprising:
means for establishing a plurality of key frames by disposing on each key frame component elements of an animation object on a selected time axis, each of said component elements defined by picture data comprising position, dimension and angle data relative to a three-dimensional coordinate system;
means for obtaining a rotational matrix R corresponding to the motion of said component elements between two of said key frames using said angle data of said two key frames;
means for calculating an orthogonal matrix T with respect to said rotational matrix R;
means for calculating a rotation angle θ of said component elements rotated around a single axis with respect to said orthogonal matrix T; and
means for forming an interpolation frame between said key frames under a condition that each of said component elements rotates around said single axis.

11. The apparatus as recited in claim 10, further comprising a means for displaying said key frames.

12. The apparatus as recited in claim 10, wherein said means for setting the key frames further includes a means for selecting a desired one of a plurality of component elements.

13. The apparatus as recited in claim 10, wherein said means for establishing the key frames includes a means for setting the coordinates of component elements.

14. A The apparatus as recited in claim 10, wherein said means for establishing the key frames further includes a means for setting the dimensions of component elements.

15. The apparatus as recited in claim 10, wherein said means for establishing the key frames includes a means for setting the rotation angles of component elements.

16. The apparatus as recited in claim 10, wherein said orthogonal matrix T satisfies the condition of $$T^{-1}RT = \begin{Bmatrix} 1 & 0 & 0 \\ 0 & \cos\theta & -\sin\theta \\ 0 & \sin\theta & \cos\theta \end{Bmatrix}.$$

17. The apparatus as recited in claim 10, wherein said means for forming an interpolation frame further comprises:
a means for obtaining a rotation angle dθ in each interpolation frame in accordance with the number S of interpolation frames within a range of said rotation angle θ using the expression θd=θd+θ/S;

means for calculating an interpolation rotational matrix Rd using the expression $$Rd = T \begin{Bmatrix} 1 & 0 & 0 \\ 0 & \cos\theta d & -\sin\theta d \\ 0 & \sin\theta d & \cos\theta d \end{Bmatrix} T^{-1}; \text{ and}$$

means for decomposing Rd into angle data around each axis of said three-dimensional coordinate system.

18. The apparatus of claim 10 wherein said single axis is one around which said object follows a minimum rotation angle between said two key frames.

19. An apparatus for producing animation data, comprising:
means for storing data of a plurality of key frames where component elements of an animation object are disposed on a selected time axis, each of said component elements defined by picture data comprising position, dimension and angle data relative to a three-dimensional coordinate system;
means for obtaining a rotational matrix R corresponding to the motion of said component elements between two of said key frames using said angle data of said two key frames;
means for calculating an orthogonal matrix T with respect to said rotational matrix R;
means for calculating a rotation angle θ of said component elements rotated around a single axis with respect to said orthogonal matrix T;
means for generating an interpolation frame between said two key frames by rotating each of said component elements around said single axis of rotation; and
means for outputting the interpolation frame thus obtained.

20. In a production of an animation sequence having a plurality of spaced apart key frames established by disposing component elements of an animation object on a selected time axis, each of said component elements defined by picture data comprising position, dimension and angle data relative to a three-dimensional coordinate system, a method comprising the steps of:
obtaining a rotational matrix R corresponding to the motion of said component elements between two of said key frames using said angle data of said two key frames;
calculating an orthogonal matrix T with respect to said rotational matrix R;
calculating a rotation angle θ of said component elements rotated around a single axis with respect to said orthogonal matrix T; and
generating an interpolation frame between an adjacent pair of said key frames by rotating each of said component elements around said single axis of rotation.

21. A method of producing animation data for an animation sequence, comprising the steps of:
creating and locating a plurality of key frames by disposing, on each key frame, component elements of an animation object on a selected time axis for said animation sequence, each of said component elements defined by picture data comprising position, dimension and angle data relative to a three-dimensional coordinate system;
calculating a single axis around which said object follows a minimum rotation angle between two of said key frames; and
generating an interpolation frame between said key frames under a condition that each of said component elements rotates around said single axis.

22. An apparatus for producing animation data, comprising:

means for establishing a plurality of key frames by disposing, on each key frame, component elements of an animation object on a select time axis, each of said component elements defined by picture data comprising position, dimension and angle data relative to a three-dimensional coordinate system;

means for calculating a single axis around which said object follows a minimum rotation angle between two of said key frames; and means for forming an interpolation frame between said key frames under a condition that each of said component elements rotates around said single axis.

* * * * *

UNITED STATES PATENT AND TRADEMARK OFFICE
CERTIFICATE OF CORRECTION

PATENT NO. : 6,151,033
DATED : November 21, 2000
INVENTOR(S) : Marumi Mihara, Masaaki Oka Page 1 of 1

It is certified that error appears in the above-identified patent and that said Letters Patent is hereby corrected as shown below:

Column 10,
Line 57, change "$=t^T_2 Rt_1$", to read --$=t^T_2 t_1$--.

Line 58, change "$=t^T_3 Rt_1$", to read --$=t^T_3 t_1$--.

Column 11,
Line 47, change "$D^2-C^2$", to read -- $-D^2-C^2$ --.

Signed and Sealed this

Fourteenth Day of August, 2001

*Attest:*

Nicholas P. Godici

*Attesting Officer*

NICHOLAS P. GODICI
*Acting Director of the United States Patent and Trademark Office*